US009371017B2

(12) United States Patent
Spence et al.

(10) Patent No.: US 9,371,017 B2
(45) Date of Patent: Jun. 21, 2016

(54) PIVOTAL HANDLE LOCK/RELEASE MECHANISM FOR CHILD CAR SEAT

(71) Applicant: KIDS II, INC., Atlanta, GA (US)

(72) Inventors: Scott R. Spence, Vinings, GA (US); Jacob Sclare, Dacula, GA (US); Michael A. Dotsey, Pottstown, PA (US); Noah E. Dingler, Phoenixville, PA (US); Patrick B. Nolan, Royersford, PA (US)

(73) Assignee: KIDS II, INC., Atlanta, GA (US)

( * ) Notice: Subject to any disclaimer, the term of this patent is extended or adjusted under 35 U.S.C. 154(b) by 175 days.

(21) Appl. No.: 13/928,834

(22) Filed: Jun. 27, 2013

(65) Prior Publication Data

US 2014/0008951 A1    Jan. 9, 2014

Related U.S. Application Data

(60) Provisional application No. 61/667,543, filed on Jul. 3, 2012, provisional application No. 61/698,942, filed on Sep. 10, 2012.

(51) Int. Cl.
*B60N 2/28* (2006.01)
*B60N 2/26* (2006.01)

(52) U.S. Cl.
CPC ............... *B60N 2/2812* (2013.01); *B60N 2/26* (2013.01); *B60N 2/265* (2013.01); *B60N 2/2821* (2013.01); *B60N 2/2845* (2013.01); *B60N 2/2851* (2013.01); *B60N 2/2875* (2013.01); *B60N 2002/2818* (2013.01); *Y10T 403/32237* (2015.01)

(58) Field of Classification Search
CPC .... B60N 2/2845; B60N 2/265; B60N 2/2812; B60N 2/2821; B60N 2/2851

USPC ....................................................... 297/183.4
See application file for complete search history.

(56) References Cited

U.S. PATENT DOCUMENTS

| 3,409,325 A | 11/1968 | Hamilton et al. |
| 4,371,206 A | 2/1983 | Johnson, Jr. |
| 4,634,175 A | 1/1987 | Wise |
| 4,634,177 A | 1/1987 | Meeker |
| 4,986,599 A | 1/1991 | Wise |

(Continued)

FOREIGN PATENT DOCUMENTS

| EP | 0050017 A1 | 4/1982 |
| EP | 0862877 A2 | 9/1998 |

(Continued)

*Primary Examiner* — Anthony D Barfield
(74) *Attorney, Agent, or Firm* — Gardner Groff Greenwald & Villanueva, PC

(57) ABSTRACT

A plurality of lock tracks on a carrier of a car seat, a slider that co-pivots with a handle of the carrier, and an actuator on the handle and moveable between lock and release positions. Each of the lock tracks defines a respective handle position. The slider is slideable between lock and release positions, and is spring-biased toward the lock position. In the slider lock position, the slider engages one of the lock tracks to secure the co-pivoting handle in the respective handle position. And in the slider release position, the slider does not engage any of the lock tracks to permit the co-pivoting handle to pivot between the handle positions. The actuator is biased toward the lock position by the spring-biased slider, and actuating the actuator from its lock position to its release position moves the slider from its lock position to its release position.

17 Claims, 10 Drawing Sheets

(56) References Cited

U.S. PATENT DOCUMENTS

| | | |
|---|---|---|
| 4,998,307 A | 3/1991 | Cone |
| 5,011,221 A | 4/1991 | Wise |
| 5,092,004 A | 3/1992 | Cone et al. |
| 5,115,523 A | 5/1992 | Cone |
| 5,143,419 A | 9/1992 | Tepper et al. |
| 5,244,292 A | 9/1993 | Wise |
| 5,364,137 A | 11/1994 | Shimer |
| 5,522,639 A | 6/1996 | Jaime |
| 5,575,530 A | 11/1996 | Harper et al. |
| 5,658,044 A | 8/1997 | Krevh |
| 5,687,985 A | 11/1997 | Sack |
| 5,775,770 A | 7/1998 | Tunney |
| 5,820,140 A | 10/1998 | Huang |
| 5,863,097 A | 1/1999 | Harper et al. |
| 5,887,935 A | 3/1999 | Sack |
| 5,961,180 A | 10/1999 | Greger et al. |
| 5,971,476 A | 10/1999 | Gibson et al. |
| 6,017,088 A | 1/2000 | Stephens et al. |
| 6,145,927 A | 11/2000 | Lo |
| 6,446,990 B1 | 9/2002 | Nania et al. |
| 6,561,577 B2 | 5/2003 | Kelly |
| 6,682,137 B2 | 1/2004 | Hsia |
| 6,715,828 B1 | 4/2004 | Cheng |
| 6,913,313 B2 | 7/2005 | Sedlack |
| 6,979,057 B2 | 12/2005 | Sedlack |
| 7,040,694 B2 | 5/2006 | Sedlack |
| 7,364,232 B2 | 4/2008 | Mees van der Bijl et al. |
| 7,455,354 B2 | 11/2008 | Jane Santamaria |
| 7,597,396 B2 | 10/2009 | Longenecker et al. |
| 7,918,499 B2 | 4/2011 | Tuckey et al. |
| 8,714,639 B2 * | 5/2014 | Heisey ................. 297/183.4 |
| 2003/0151220 A1 | 8/2003 | Hou |
| 2005/0168023 A1 | 8/2005 | Gangadharan et al. |
| 2007/0114825 A1 | 5/2007 | Lan |
| 2012/0104808 A1 * | 5/2012 | Sellers et al. ........ 297/183.4 X |

FOREIGN PATENT DOCUMENTS

| | | | | |
|---|---|---|---|---|
| EP | 1591307 A2 * | 11/2005 | ........... | B60N 2/2821 |
| JP | 2001334855 A | 12/2001 | | |

* cited by examiner

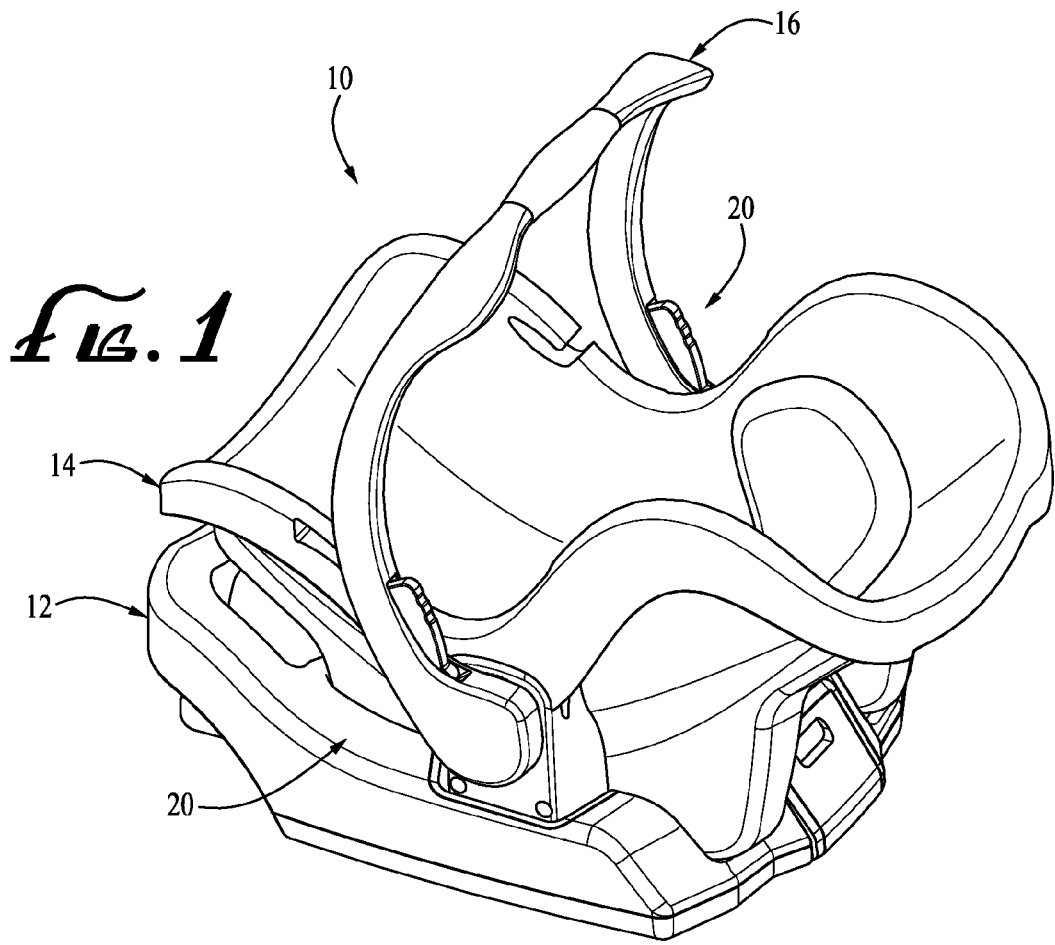
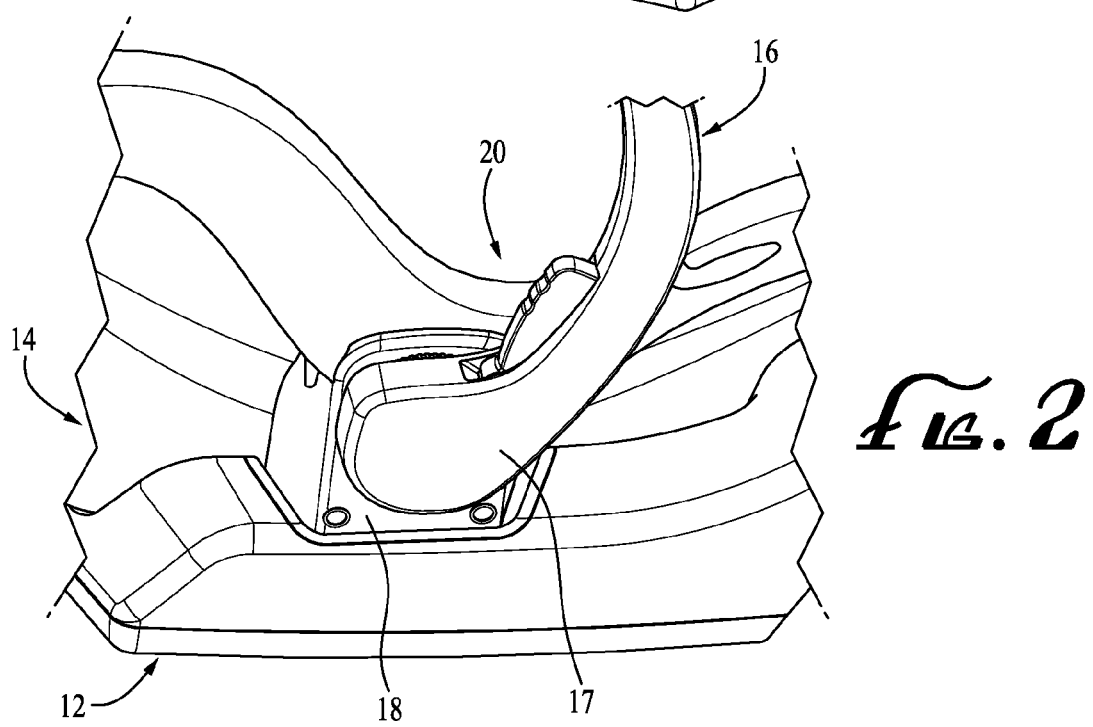

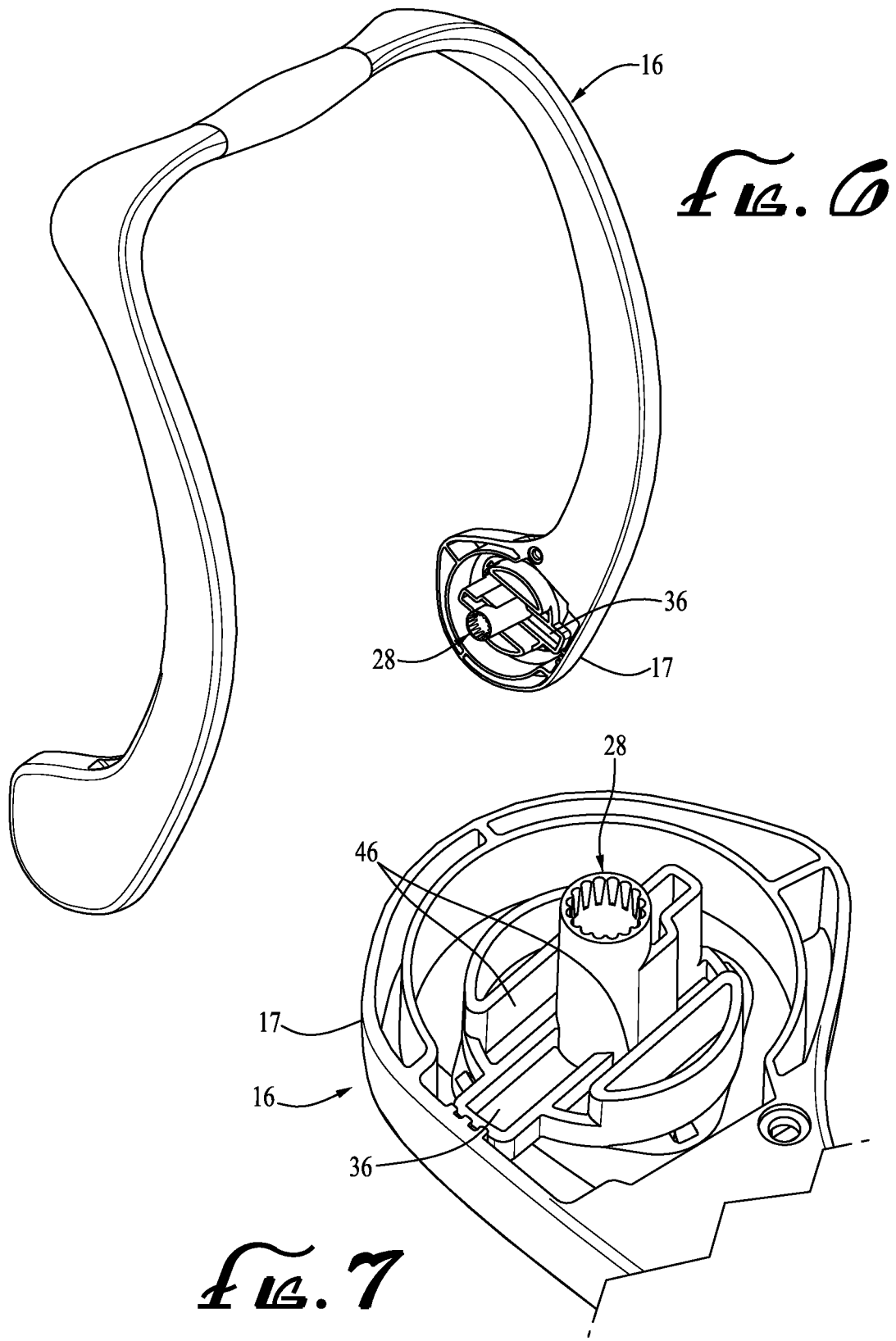

PIVOTAL HANDLE LOCK/RELEASE MECHANISM FOR CHILD CAR SEAT

CROSS-REFERENCE TO RELATED APPLICATIONS

This application claims the priority benefit of U.S. Provisional Patent Application Ser. No. 61/667,543 filed Jul. 3, 2012, and U.S. Provisional Patent Application Ser. No. 61/698,942 filed Sep. 10, 2012, the entireties of which are hereby incorporated herein by reference for all purposes.

TECHNICAL FIELD

The present invention relates generally to the field of child car seats, and more particularly to repositionable carrying handles of child carriers of such child car seats.

BACKGROUND

Child car seats typically include a base and a carrier that detachably mount together. The base can be secured to the back seat of a vehicle, a child can be secured in the carrier, and the carrier can be releasably secured to the base. Then the carrier can be detached from the base and used to carry the child around. And some such mobile carriers can then be mounted to and used with other child-transport systems such as strollers.

To facilitate carrying and handling the carrier, conventional carriers include a carrying handle, typically in the form of a rigid loop extending side-to-side above the carrier. Because the position of the handle when used for carrying the carrier is obstructing when the carrier is used mounted to the base, the handles are sometimes provided with repositioning features. These repositioning features permit the handles to swing down from the upright carrying position, and some of them include mechanisms that function to lock the handles in multiple positions for different uses and selectively release the lock for repositioning the handle between positions. But these existing mechanisms can be cumbersome and awkward to operate, especially when leaning over into the vehicle.

Accordingly, it can be seen that needs exist for improvements for repositionable carrying handles of carriers of child car seats and/or of other child-transport devices to make the carriers easier to use but still safe and reliable. It is to the provision of solutions meeting these and other needs that the present invention is primarily directed.

SUMMARY

Generally described, the present invention relates to lock/release mechanisms for pivotal carrying handles of child-transport devices, and to child-transport devices including such pivotal carrying handles and lock/release mechanisms. Such child-transport devices include car seats, strollers, and other devices that include and/or are for use with a child carrier having a pivotal carrying handle. In these child-transport devices, the lock-release mechanism provides for repositioning the handle to multiple discrete positions for convenience of use.

The lock-release mechanism includes a plurality of lock tracks on the carrier of the car seat, a slider that co-pivots with the carrier handle and is moveable between lock and release positions, and an actuator on the carrier handle that is moveable between lock and release positions. Each of the lock tracks is dedicated to defining a respective discrete handle position. The slider is slideable along each of the lock tracks between its lock and release positions, and is spring-biased toward the lock position. In the slider lock position, the slider engages a dedicated one of the lock tracks to secure the co-pivoting handle in the respective handle position. And in the slider release position, the slider does not engage any of the lock tracks to permit the slider to pivot between alignment with the lock tracks as the handle is pivoted between the handle positions. The actuator is biased toward its lock position for example by the spring-biased slider, and actuating the actuator from its lock position to its release position moves the slider from its lock position to its release position. In the depicted embodiment, for example, the plurality of handle positions include a first upright carrying position for carrying the carrier, a second partially lowered access position for allowing access to an interior of the carrier, and a third lowered support position for propping the carrier on a support surface to prevent rocking.

In one aspect of the invention, the lock tracks can be radially extending with the slider sliding radially along the lock tracks and with the release position of the slider being positioned radially inwardly relative to the lock position of the slider. In addition, a shaft can be provided that pivotally mounts the handle to the carrier, with a spring positioned between the pivot shaft and the slider to provide the spring-biasing of the slider radially inward toward the slider lock position. Furthermore, the carrier can include a curved space that is positioned radially inward of the lock tracks, positioned radially outward of and coaxial with the pivot shaft, and in communication with the lock tracks so that the slider can pivot through the space when the slider is in the release position. Moreover, two stop surfaces can be positioned at the ends of the curved space adjacent the first and last lock tracks, and are contacted by the slider in the slider release position when the handle is pivoted to limit the pivoting travel range of the handle.

In another aspect, the slider can include a head and tail extending axially from the head, with the slider tail sliding along each of the lock tracks. The slider head is positioned laterally spaced from and not engaged by any of the lock tracks, and instead is engaged by a guide track on the handle. In addition, the carrier lock tracks can be provided by channels that are formed in the carrier and that slidingly receive the slider tail in the slider lock position to prevent pivoting of the handle relative to the carrier and that do not receive the slider tail in the slider release position to permit pivoting of the handle relative to the carrier. Furthermore, the handle guide track can be provided by a channel that is formed in the handle and that receives the slider head to permit it to slide between the slider lock and release positions but that retains it so that it pivots with the handle. Moreover, the slider can include a body extending between the head and the tail, having a recess that receives the spring positioned between the slider and the pivot shaft, and having a U-shape with two arms defining a guide slot in which the pivotal shaft is received and the spring is retained. And the handle can define rails that receive the arms between them for providing additional or alternative guidance of the slider.

In still another aspect, the actuator is provided by a pivotal arm that is pivotally mounted to the handle and that is depressed toward the handle from the actuator lock position to the actuator release position to move the slider from the slider lock position to the slider release position. For example, the pivotal arm can include a pivot point and an actuating portion and a lever portion on opposite sides of the pivot point, with the actuating portion extending out of the handle and exposed for depressing by a user, and with the lever portion contacting the slider. The pivotal arm can be positioned laterally spaced from the lock tracks, with the pivotal arm and the slider moveable in the same plane, and with the slider engageable by the pivotal arm free of interference with the lock or guide tracks.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of typical or preferred embodiments of the invention, and are not restrictive of the invention, as claimed.

BRIEF DESCRIPTION OF THE DRAWINGS

FIG. 1 is a perspective view of a child car seat with a carrier having a pivotal carrying handle and a lock/release mechanism for the handle according to an example embodiment of the present invention.

FIG. 2 is a detail perspective view of the handle lock/release mechanism of the child car seat of FIG. 1.

FIG. 6 is a perspective view of the handle of the carrier of FIG. 1, showing details of internal components of the lock/release mechanism.

FIG. 7 is a perspective detail view of a portion of the handle of FIG. 6, showing the guide track for radially guiding the slider and preventing pivoting of the handle relative to the slider.

DETAILED DESCRIPTION OF EXAMPLE EMBODIMENTS

Figure 3:
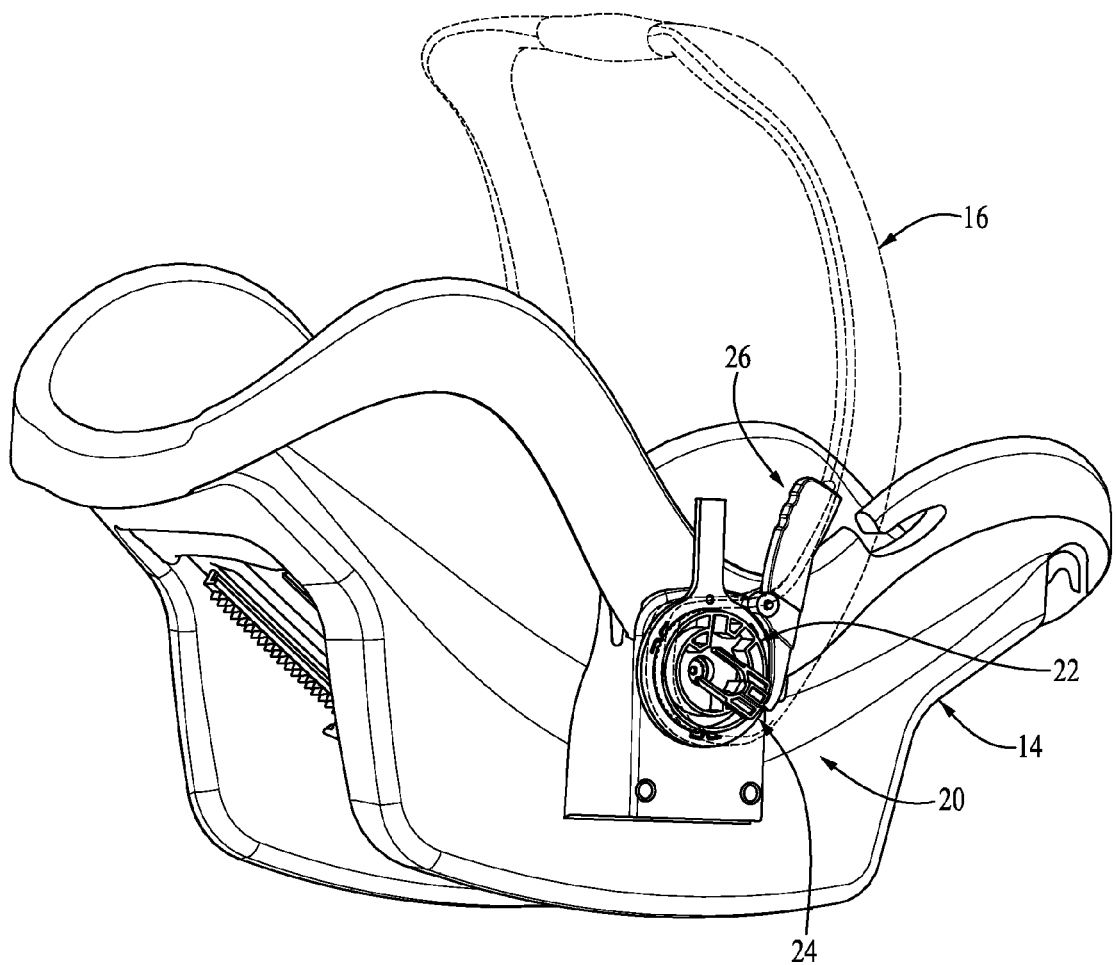
FIG. 3 is a perspective view of the child carrier with the handle lock/release mechanism of FIG. 1, with the handle shown in phantom lines and with the pivot shaft and spring not shown to reveal internal components of the lock/release mechanism, and with the handle lock/release mechanism shown in the lock position.

The present invention may be understood more readily by reference to the following detailed description of the invention taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-18 show a child car seat 10 including a handle lock/release mechanism 20 according to an example embodiment of the present invention. While the lock/release mechanism 20 is shown and described with reference to carriers 14 of car seats 10, persons of ordinary skill in the art will appreciate that the mechanism can be implemented in carriers of other child-transport devices such as strollers. And while the lock/release mechanism 20 is oftentimes referred to in the singular, it should be noted that this is done for convenience, as in typical embodiments each carrier 14 includes two of the mechanisms, as depicted in FIG. 1.

As shown in FIGS. 1-3, the car seat 10 includes a base 12 and a carrier 14 that detachably mount together. The base 12 can be secured to the back seat of the vehicle, a child can be secured in the carrier 14, and the carrier can be releasably secured to the base to transport the child in the vehicle. Then the carrier 14 can be detached from the base 12 and its carrying handle 16 can be used to carry the child around outside of the vehicle. The handle 16 is in the form of a rigid loop extending side-to-side above the carrier 14, with end portions 17 that are pivotally mounted to handle-mounting portions 18 of the carrier 14.

The lock/release mechanism 20 includes a plurality of lock tracks 22 on the handle-mounting portions 18 of the carrier 14, a slider 24 coupled to the end portions 17 of the handle 16 so that it pivots with the handle and is moveable between lock and release positions, and an actuator 26 on the handle that is moveable between lock and release positions. Each of the lock tracks 22 is dedicated to defining a respective discrete handle position. The slider 24 is slideable along each of the lock tracks 22 between its lock and release positions, and is spring-biased toward the lock position. In the slider lock position, the slider 24 engages a dedicated one of the lock tracks 22 to secure the co-pivoting handle in the respective handle position. And in the slider release position, the slider 24 does not engage any of the lock tracks 22 to permit the slider to pivot between alignment with the lock tracks as the handle 16 is pivoted between the handle positions. The actuator 26 is biased toward its lock position for example by the spring-biased slider 24, and actuating the actuator from its lock position to its release position moves the slider from its lock position to its release position.

The lock tracks 22, the slider 24, and the actuator 26 of the lock/release mechanism 20 can be made of conventional materials selected for strength, light weight, and ease of manufacture. Such materials include plastics, metals, composites, and/or other materials known in the art. In addition, these components of the lock/release mechanism 20 can be made using conventional fabrication techniques and equipment, such as by molding or casting the parts.

Having generally described the major components of the lock/release mechanism 20, for illustration purposes the details of an example embodiment will now be described with references to FIGS. 2-11. In the depicted embodiment, the two handle-mounting portions 18 of the carrier 14 and the two end portions 17 of the handle 16 are generally vertical, with the handle-mounting portions on the outward-facing opposing sidewalls of the carrier and with the end portions on the inward-facing walls of the handle at and near its opposing termination ends. In alternative embodiments, the carrier handle-mounting portions and the handle end portions are located in interior spaces of their respective components, angled from vertical, and/or configured in other ways. And the handle 16 is pivotally mounted to the carrier 14 by a pivot shaft 28, which can be integrally formed as a part of the handle (as depicted in FIGS. 6-7). Alternatively, the pivot shaft can be integrally formed as a part of the carrier or provided as a separate part.

Figure 4:
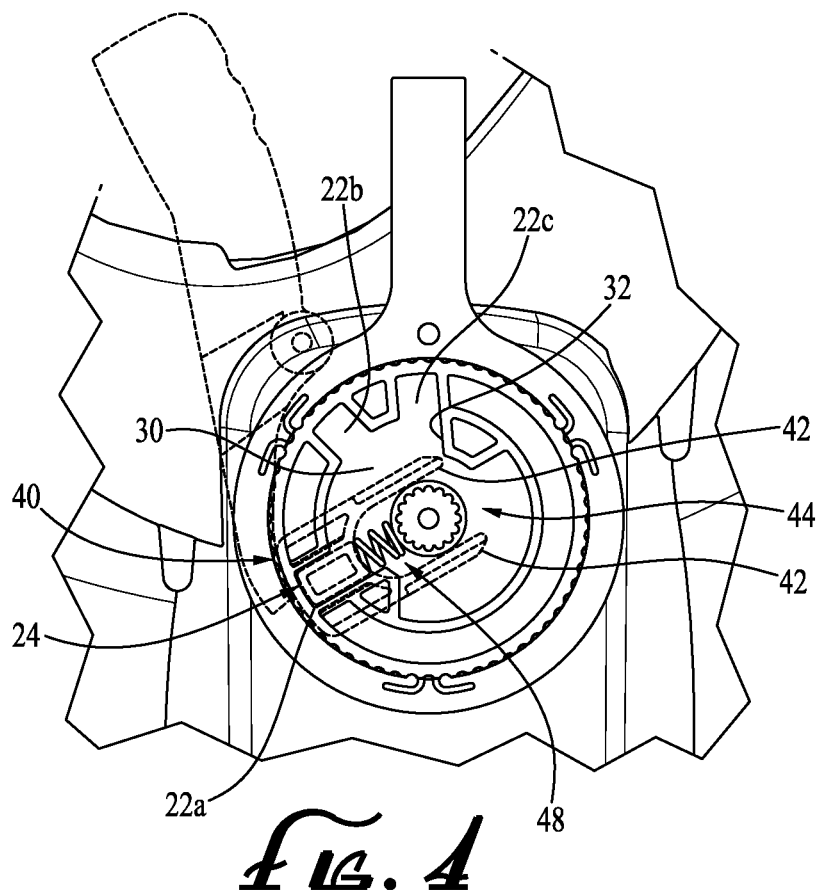
FIG. 4 is an opposite side detail view of a portion of the handle lock/release mechanism of FIG. 3, with the handle not shown and with the slider and the actuator in phantom lines to better show the guide tracks and related elements, with the spring shown, and with the lock/release mechanism shown in the lock position.

Typically, the number of the lock tracks 22 included is selected to correspond to the number of handle positions desired, with each lock track defining a respective discretely indexed handle position. That is, each lock track 22 is aligned with and engaged by the slider 24 in only a single handle position corresponding to that lock track; none of the lock tracks are engaged by the slider in multiple handle positions. For example, the depicted embodiment includes three locks tracks 22a-c (collectively referred to as the "lock tracks 22") to define three respective discretely indexed handle positions (FIG. 4). In other embodiments, only two or more than three lock tracks are provided to define the same number of discrete handle positions, multiple lock tracks cooperatively define a single handle position, or each lock track can be used in more than one handle position.

Figure 5:
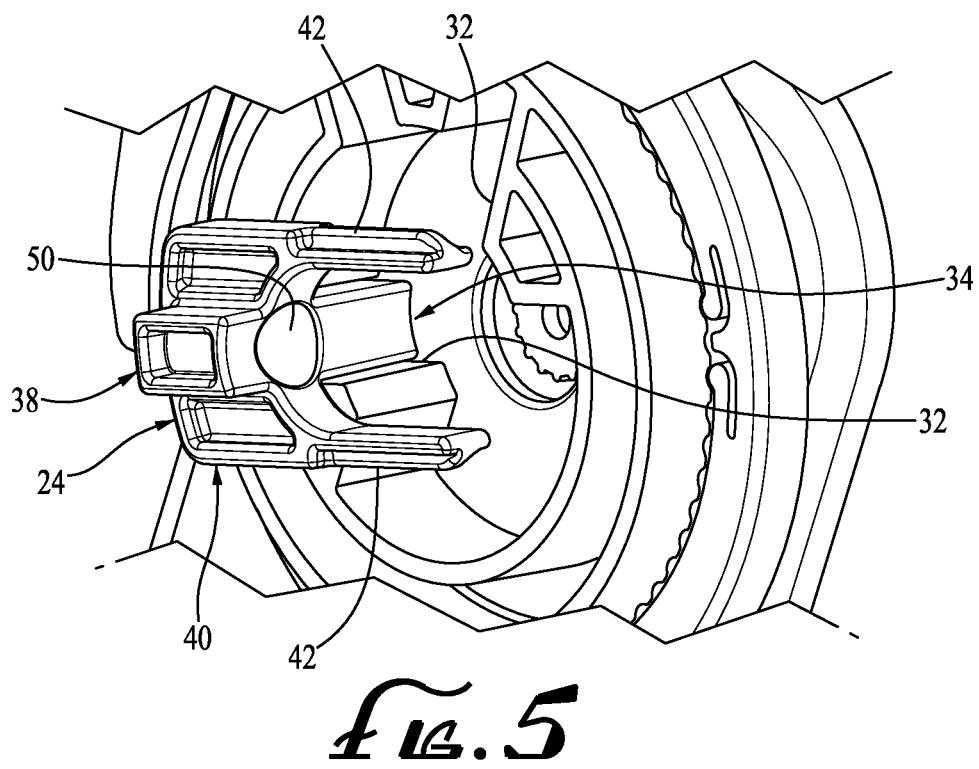
FIG. 5 is a perspective detail view of the handle lock/release mechanism portion of FIG. 4, with the spring removed and with the slider and the actuator in solid lines to show details of the slider.
Figure 8:
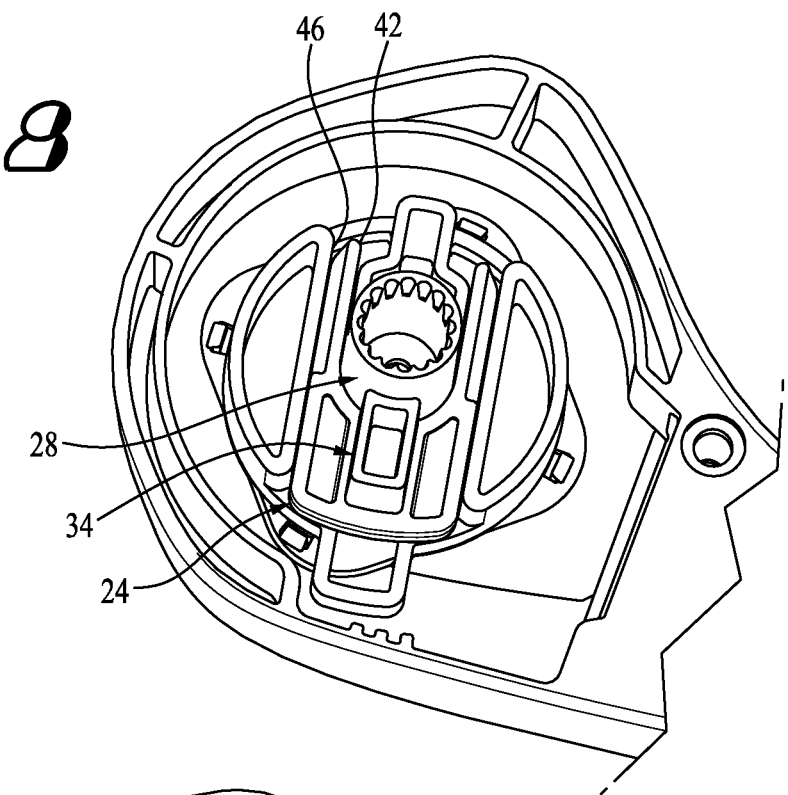
FIG. 8 is a perspective detail view of the handle portion of FIG. 6, showing the guide track engaging the slider in the release position.
Figure 9:
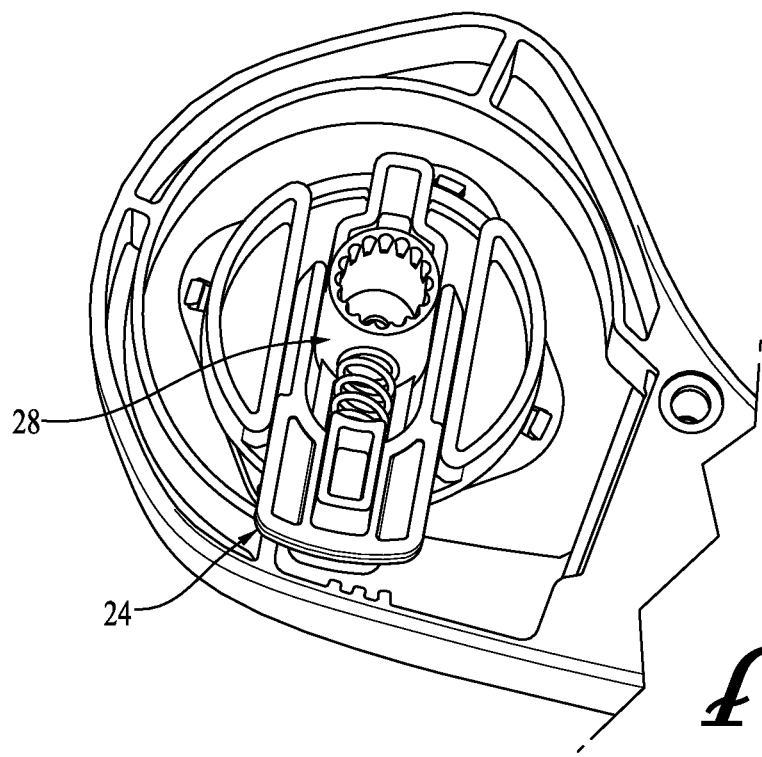
FIG. 9 shows the handle portion of FIG. 8, with the slider in the lock position.
Figure 10:
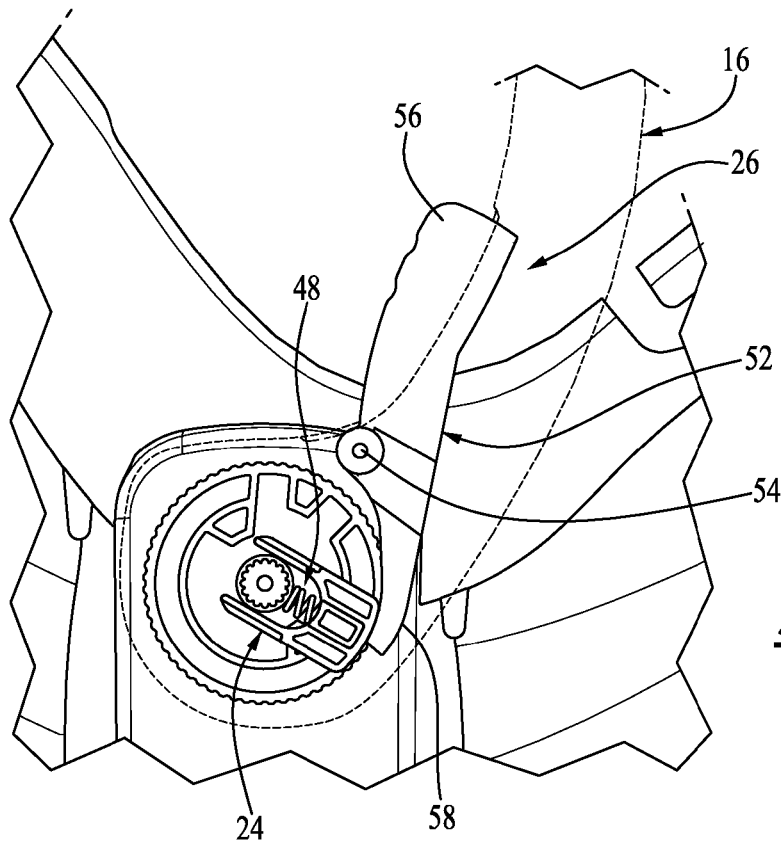
FIG. 10 is an opposite side detail view of the handle lock/release mechanism of FIG. 4, showing the lock/release mechanism in the lock position.
Figure 11:
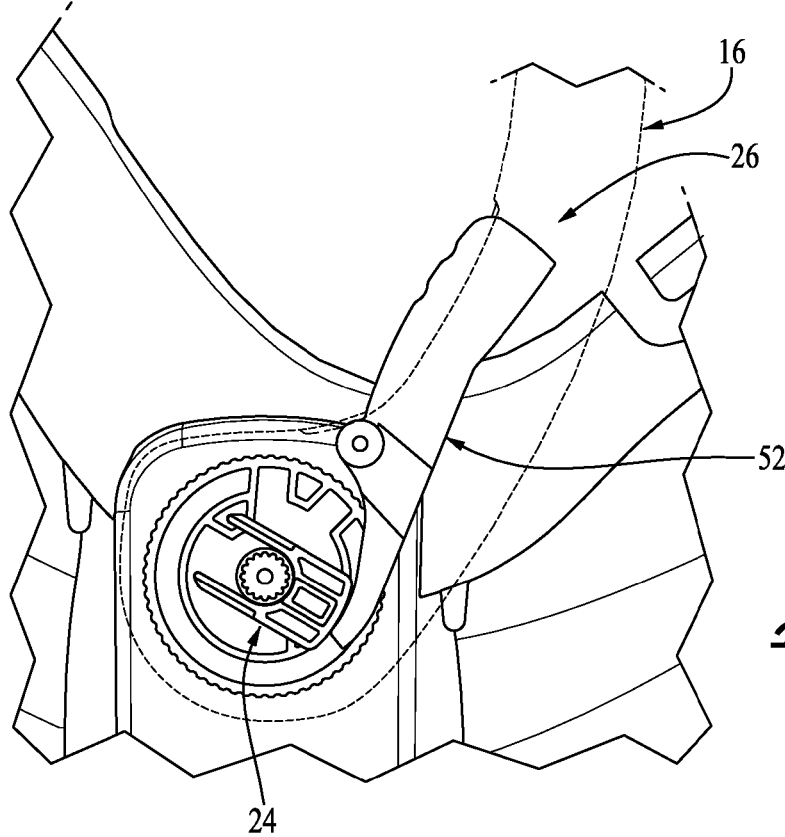
FIG. 11 shows the handle lock/release mechanism of FIG. 10, with the lock/release mechanism in the release position.

Referring particularly to FIGS. 4-5, the lock tracks 22 of the depicted embodiment are generally radially arranged so that the slider 24 can slide radially along them between the slider lock position (see also FIG. 10) and the slider release position (see also FIG. 11). For example, the slider release position (defined by disengagement from the lock tracks) can be positioned radially inwardly relative to the slider lock position (defined by engagement with the lock tracks). The lock tracks 22 need not be precisely radially arranged as long as the slider 24 can slide along them between the release and lock positions. And the carrier handle-mounting portion 18 can include a curved space 30 that is positioned radially outward of and coaxial with the pivot shaft 28, and positioned radially inward of and in communication with all of the lock tracks 22 so that the slider 24 can pivot through the curved space and between the lock tracks when the slider is in the release position. In this way, when the slider 24 is in the lock position, and thus engaged with one of the lock tracks 22, it is held by that lock track so that it cannot pivot with the handle 16, thereby locking the handle in the respective position corresponding to that particular lock track. And when the slider 24 is in the release position, and thus not engaged with one of the lock tracks 22 but instead located in the curved space 30, it is free to pivot through the curved space as the handle 16 pivots, thereby permitting the slider to be repositioned into another of the lock tracks and thereby permitting the handle to be repositioned to another of the handle positions.

In addition, two stop surfaces 32 can be positioned at the opposing ends of the curved space 30 adjacent the first and last lock tracks 22a and 22c so that they are contacted by the slider 24 in the slider release position when the handle 16 is pivoted to limit the pivoting travel range of the handle. That is, when the handle 16 and the slider 24 are pivoted together with the slider in the release position, and the slider hits one of the stop surfaces 32, this abutment provides a mechanical stop that prevents the slider from pivoting farther, which in turn prevents the handle from pivoting farther. As such, the stop surfaces 32 effectively define the two opposing ends of the curved space 30, and in the depicted embodiment are positioned radially inward relative to the lock tracks 22. In the depicted embodiment, the stop surfaces 32 are provided by walls forming the two opposing ends of the curved space 30 and extending in-line from the farthest-apart walls that form the first and last lock tracks 22a and 22c. In other embodiments, the stop surfaces are formed by pins, bumps, wall segments, or other protrusions extending into the curved space, whether they form the ends of the curved space or not.

Furthermore, the lock tracks 22 can be provided by channels that are formed in the carrier 14 and that slidingly receive the slider 24 in the slider lock position to prevent pivoting of the handle relative to the carrier and that do not receive the slider in the slider release position to permit pivoting of the handle relative to the carrier. The lock-track channels 22 can be provided by grooves, slots, notches, or any space formed between two opposing walls or other structural elements (e.g., pins, bumps, or wall segments) that permit the slider 24 to align with and move along them between the lock and release positions but that physically block pivotal movement of the slider (and thus the handle 16) in the lock position. Typically, the lock-track channels 22 are formed by two opposing sidewalls that receive the slider (in this context, persons of ordinary skill will understand that the channels receive only a sliding engagement portion of the slider, not the entire slider) with a fit that permits the sliding movement freely to avoid binding but that also does not permit excess play to provide smooth operation. In embodiments such as this, the slider 24 includes a tail 34 that extends into, slides along, and is guided by the lock-track channels 22 between the lock and release positions, with the tail provided by any protruding element that provides this functionality. In alternative embodiments, the lock tracks include protrusions extending from the carrier and the slider defines channels that slidingly receive the protrusions in a vice-versa arrangement. And in other alternative embodiments, the lock tracks and slider define a mating tongue-and-groove assembly or other track assembly the permits the slider to move between the lock and release positions.

Referring additionally to FIGS. 6-9, the slider 24 engages the handle 16 such that the slider pivots only when the handle pivots, that is, such that there is no pivotal movement of the slider relative to the handle. (And, of course, the slider 24 pivots only when it is in the release position not engaged by any of the lock tracks 22 and is not blocked by the stop surface 32 preventing pivoting in the desired angular direction). In addition, the slider 24 engages the handle 16 such that the slider can move between the lock and release positions. To provide this functionality, the handle 16 can include a guide track 36 that engages the slider 24. In the depicted embodiment, for example, the guide track 36 is provided by a channel and the slider 24 includes a head 38 extending from the tail 34 (indirectly, e.g., via an interposed body, or directly) and slidingly received in the channel. The guide-track channel 36 receives the slider head 38 so that the slider 24 can slide along the channel between its lock and release positions and so that the slider head is physically blocked from pivotal movement relative to the handle 16 in any position so that the slider pivots with the handle. The slider head 38 extends axially (relative to the generally radial lock tracks, i.e., laterally, outward, and generally horizontal relative to the carrier sides) from the tail and is positioned laterally spaced from and not engaged by any of the lock tracks. The guide-track channel 36 can be provided by a groove, slot, notch, or any space formed between two opposing structural elements that permit the slider 24 to move along them between the lock and release positions but that physically block pivotal movement of the slider in any position. In alternative embodiments, the guide track includes a protrusion extending from the handle and the slider defines a channel that slidingly receives the protrusion in a vice-versa arrangement. And in other alternative embodiments, the guide tracks and slider define a mating tongue-and-groove assembly or other track assembly that provides the functionality described herein.

In addition, the slider 24 can include a body 40 that extends between the head 38 and the tail 34 and that does not engage the carrier lock tracks 22 or the handle guide track 36. The slider body 40 provides a good location for engagement by the actuator 26, though any portion of the slider head 38 or tail 34 not engaging the handle guide track 36 or the carrier lock tracks 22 can be adapted for this engagement. And in some embodiments, the slider and the actuator are provided as one part either integrally formed or connected together, with this engagement being in the form of a connection that is not decoupleable in the normal use of the carrier 14.

The slider body 40 of the depicted embodiment is generally U-shaped with two arms 42 defining a guide slot 44 in which the pivot shaft 28 is received for guidance between the lock and release positions for smooth operation of the lock/release mechanism 20 (see FIGS. 4-5). To further provide for smooth operation of the lock/release mechanism 20, the handle 16 can include two inward-facing rails 46 along which the slider arms 42 are slidingly guided (see FIGS. 8-9). In some embodiments, the engagement between the slider and the handle that causes them to pivot together while permitting the slider to slide between the lock and release position is provided by the slider-head-and-guide-track arrangement, the slider-arm-and-rail arrangement, and the slider-arm-and-pivot-shaft arrangement (as depicted). In other embodiments, this functionality is provided by only one or two of these (except that the slider-arm-and-pivot-shaft arrangement alone does not provide the co-pivoting feature), with the other one or two of these eliminated. And in still other embodiments, this functionality is provided by other slide-but-don't-pivot assemblies including telescoping, rotationally retracting, or other elements, as understood by persons of ordinary skill in the art.

A spring 48 is provided for biasing the slider 24 toward the lock position. For example, the spring 48 can be provided by a coil compression spring that biases the slider 24 radially inward toward the slider lock position, as depicted. Alternatively, another conventional spring element (e.g., one or more leaf, tension, or torsion springs, or other resilient spring elements) can be provided to bias the slider toward the lock position. In the depicted embodiment, the spring 48 contacts and directly biases the slider 24, and the actuator 26 is indirectly biased toward the lock position by its engagement with the spring-biased slider 24. In other embodiments, a second/separate spring is provided for biasing the actuator toward its lock position. And in yet other embodiments, one spring is provided, which directly biases the actuator toward the lock position, and a coupled engagement between the slider and the actuator indirectly provides the spring-biasing of the slider toward its lock position.

In typical embodiments such as that depicted, the slider body 40 includes a recess 50 that at least partially receives and thus seats the spring 48, which is positioned between the slider 24 and the pivot shaft 28 to directly bias the slider radially outward toward the lock position (see FIGS. 4-5). When the slider 24 is slid to its release position against the spring force, the spring 48 compresses so that it is completely (as depicted) or at least partially within the recess 50 as it charges (see FIGS. 10-11). In embodiments with the slider body arms 42, their position on opposing sides of the spring 48 retains the spring between them to help hold the spring in place.

Referring now particularly to FIGS. 10-11, the actuator 26 of the depicted embodiment is provided by a pivotal arm 52 that is pivotally mounted to the handle 16 and that is depressed toward the handle from the actuator lock position (FIG. 10) to the actuator release position (FIG. 11) to move the slider 24 from the slider lock position to the slider release position, respectively. For example, the pivotal arm 52 can include a pivot point 54, and an actuating portion 56 and a lever portion 58 on opposite sides of the pivot point, with the actuating portion extending out of the handle 16 and exposed for depressing by a user, and with the lever portion contacting the slider 24. The pivotal arm 52 is positioned laterally spaced from the lock tracks 22, with the pivotal arm and the slider 24 movable in the same plane, and with the slider engageable by the pivotal arm free of interference with the lock tracks. In the depicted embodiment, the actuator and the slider are provided by two separate parts that cooperate together, and in other embodiments they are provided by one part either integrally formed or assembled together. In other embodiments, the actuator includes a pivotal arm that is pulled, a push-button that is linearly depressed, a knob that is rotated, a handle that is twisted, or a slide element that is slid, to move from its lock to its release position.

Figure 12:
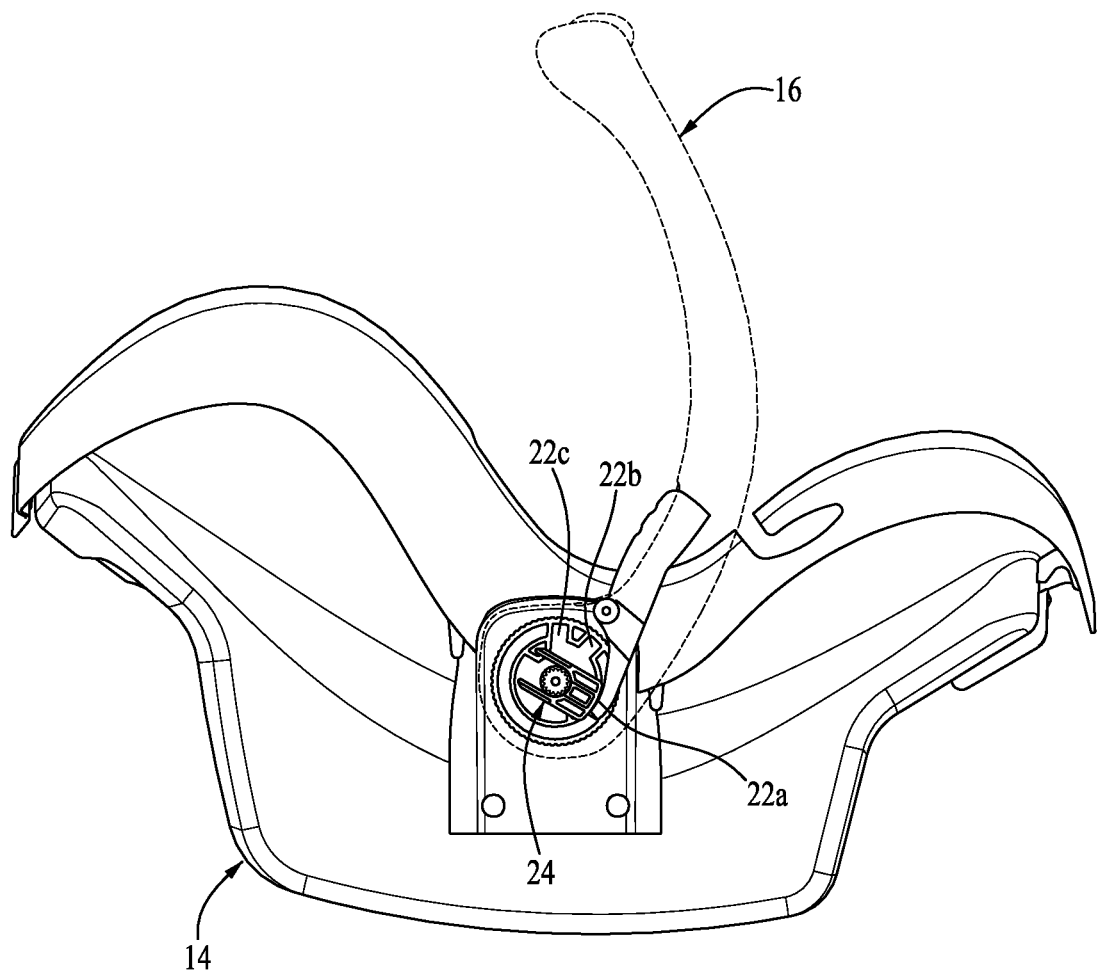
FIG. 12 is a side view of the child carrier with the handle lock/release mechanism of FIG. 3, showing the handle in a first upright carry position for carrying the carrier, and showing the handle lock/release mechanism in the release position.
Figure 13:
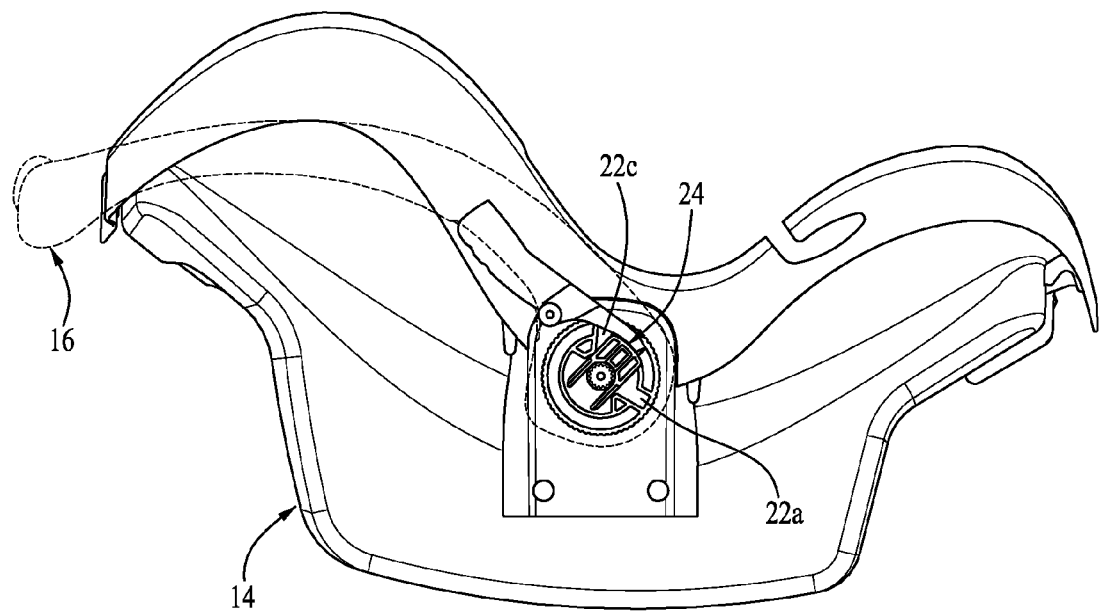
FIG. 13 shows the child carrier of FIG. 12 with the handle in a second partially lowered access position for allowing access to an interior of the carrier.
Figure 14:
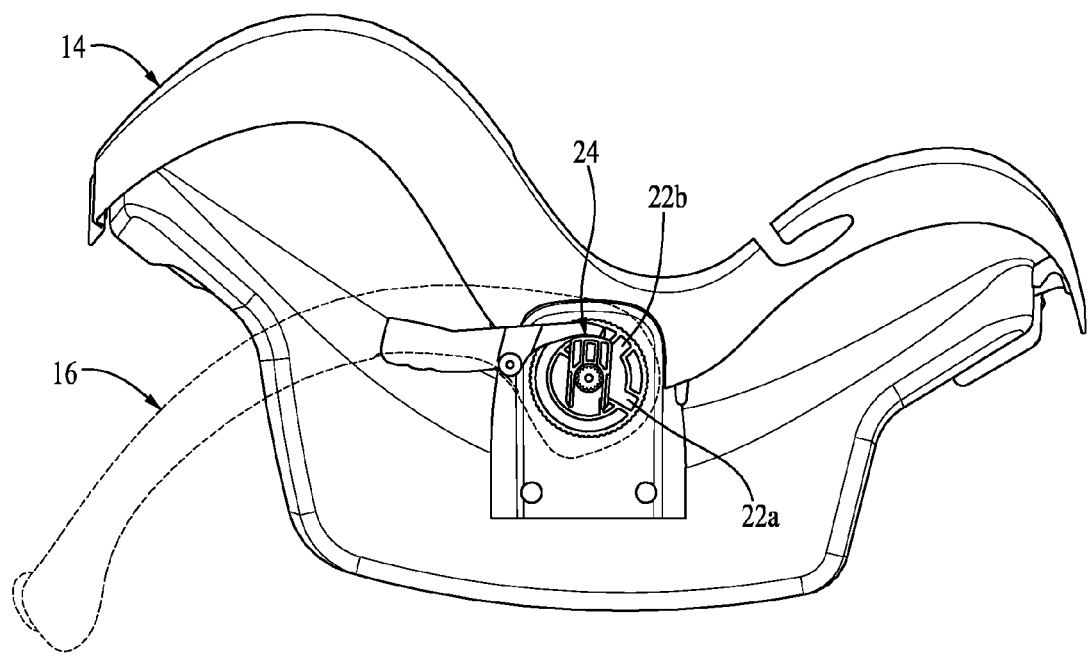
FIG. 14 shows the child carrier of FIG. 12 with the handle in a third lowered support position for propping the carrier on a support surface to prevent rocking.

Having described details of the structure of the lock/release mechanism 20, details of its operation and use will now be described with reference to FIGS. 12-18. As mentioned above, the depicted embodiment can be used to reposition the handle 16 between three positions by repositioning the slider 24 between three lock tracks 22a-c. FIG. 12 shows the handle 16 in a first upright carrying position for carrying the carrier 14, with the slider 24 engaged by the first lock track 22a. FIG. 13 shows the handle 16 in a second partially lowered access position for allowing access to an interior of the carrier, with the slider 24 engaged by the second lock track 22b. And FIG.

14 shows the handle 16 in a third lowered support position for propping the carrier on a support surface to prevent rocking, with the slider 24 engaged by the third lock track 22c. As noted above, the lock/release mechanism alternatively can be provided with more or fewer lock tracks for defining the desired number of handle positions.

Figure 15:
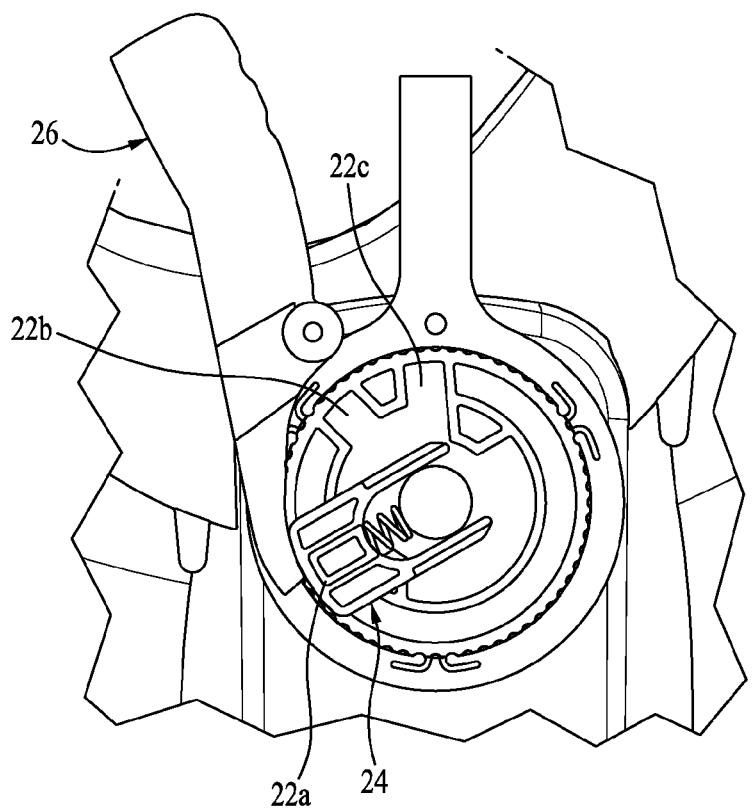
FIG. 15 is an opposite side detail view of the handle lock/release mechanism of FIG. 13, with the handle removed to show the lock/release mechanism in the lock position when the handle is in the carry position.
Figure 16:
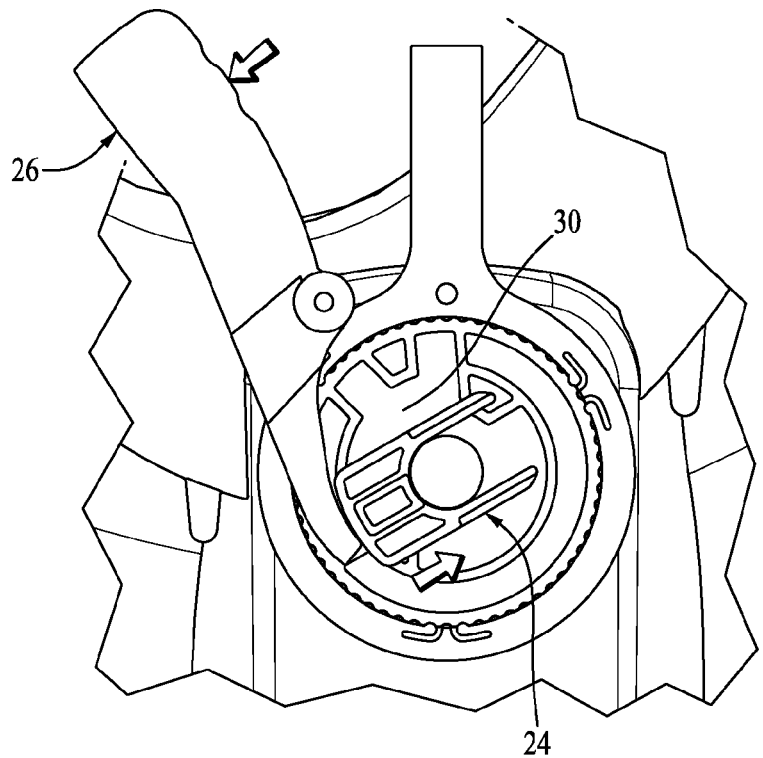
FIG. 16 shows the handle lock/release mechanism of FIG. 15, with the lock/release mechanism in the release position.

The following steps illustrate, as an example, repositioning the handle 16 from the carrying position to the access position. FIG. 15 shows the slider 24 engaged by the first lock track 22a in the slider lock position, with the actuator 26 in the actuator lock position, so the handle 16 is now locked in the carrying position. FIG. 16 shows the actuator 26 pivotally actuated to the actuator release position (as indicated by the corresponding directional arrow) to force the slider 24 against the spring force into the curved space 30 in the release slider position (as indicated by the corresponding directional arrow). The handle 16 can now be repositioned by simply pivoting the handle. Once the slider 24 has pivoted clear of alignment with the first track 22a, the actuator 26 can be released, and the slider will be retained in the radially-inward release position by the radially outward wall of the curved space 30.

Figure 17:
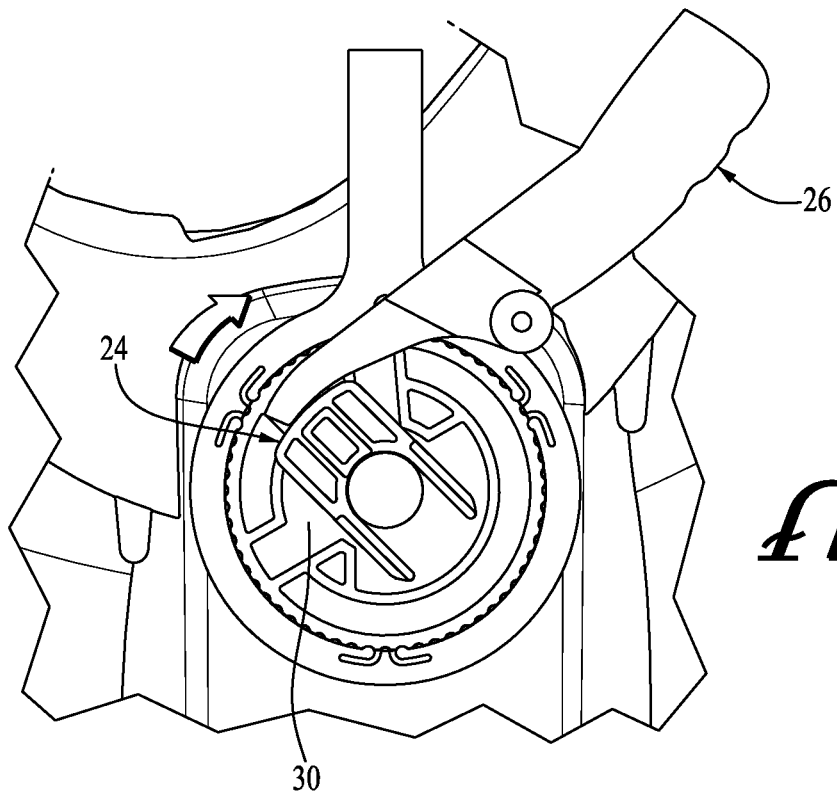
FIG. 17 shows the handle lock/release mechanism of FIG. 16, with the handle pivoted to the access position while the lock/release mechanism is in the release position.
Figure 18:
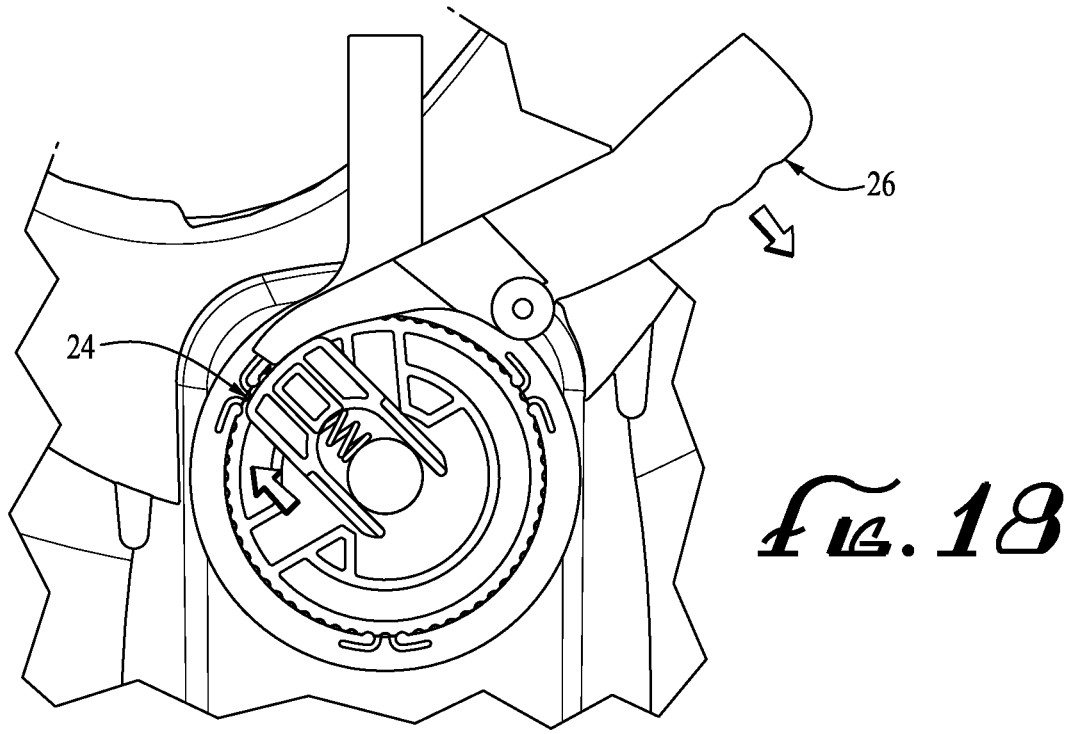
FIG. 18 shows the handle lock/release mechanism of FIG. 17, with the lock/release mechanism in the lock position when the handle is in the access position.

FIG. 17 shows the actuator 26 and the slider 24 pivoted (as indicated by the corresponding directional arrow) because and as the handle 16 is pivotally repositioned. In this position, the slider 24 has just now come into alignment with the second lock track 22b, and for illustration purposes is shown still in the slider release position engaging the curved space 30. After a brief moment (assuming the actuator 26 has not been retained in the actuator release position by the user), the slider 24 is propelled to its lock position in the aligned second lock track 22b under the force of the discharging spring 48, which in turn forces the actuator 26 back to its lock position. The slider 24 is now engaged by the second lock track 22b in the slider lock position, with the actuator 26 in the actuator lock position, so the handle 16 is now locked in the access position, as shown in FIG. 18.

In an alternative embodiment, the lock/release mechanism is similar to that described above in that it includes a plurality of lock tracks, a spring-biased slider, and an actuator. In this embodiment, however, there are two sliders/pins, one formed on a radially inward surface of a curved (e.g., loop-shaped) member defining an opening (e.g., oval-shaped) that is eccentrically arranged with the pivot shaft, and the other formed on a radially outward surface of the curved member. And there are two series of lock tracks, an inner series and an outer series of lock tracks for locking engagement by the respective sliders/pins. In addition, a link member extends between the curved member and the actuator, with the link member pivotally coupled to the actuator (so the slider is connected to the actuator via the curved and link members). Furthermore, the spring imparts a rotational/pivotal biasing force on the slider via the curved member. The operation of this embodiment is similar, particularly as detected by the user.

While the invention has been described with reference to preferred and example embodiments, it will be understood by those skilled in the art that a variety of modifications, additions and deletions are within the scope of the invention, as defined by the following claims.

What is claimed is:

1. A child transport carrier having a pivotal carrying handle with a lock-release mechanism comprising:
   a plurality of lock tracks on the carrier, wherein the lock tracks define a plurality of handle positions;
   a slider that pivots with the handle and is slideable between a lock position and a release position, wherein in the lock position the slider engages one of the lock tracks to secure the handle in the respective handle position, in the release position the slider does not engage any of the lock tracks to permit the handle to pivot between the handle positions, and the slider is spring-biased toward the lock position;
   an actuator mounted to the handle and moveable between a lock position and a release position, wherein the actuator is spring-biased toward the lock position, and actuating the actuator from the lock position to the release position moves the slider from the lock position to the release position;
   wherein the handle includes a guide track and the slider includes a head and tail extending from the head, the slider tail is slidingly engageable by each of the carrier lock tracks to permit the slider to slide between the slider lock and release positions, the slider head extends axially from the tail and is positioned laterally spaced from the lock tracks, and the slider head is engaged by the handle guide track to pivot the slider with the handle but to permit the slider to slide between the slider lock and release positions; and
   a shaft pivotally mounting the handle to the carrier and a spring that provides the spring-biasing of the slider toward the slider lock position, wherein the slider further comprises a body that is positioned between the head and the tail, is engageable by the actuator, is not engageable by the carrier lock tracks or the handle guide track, defines a recess that receives the spring with the spring positioned between the shaft and the slider, and is generally U-shaped with two arms extending on opposite sides of the pivot shaft to define an interposed guide slot in which the pivot shaft is received and the spring is retained, and wherein the actuator is spring-biased toward the lock position by the spring-biased slider.

2. The child transport carrier with lock-release mechanism of claim 1, wherein the carrier lock tracks are radially extending and the slider slides radially along the lock tracks.

3. The child transport carrier with lock-release mechanism of claim 2, wherein the release position of the slider is radially inward relative to the lock position of the slider.

4. The child transport carrier with lock-release mechanism of claim 2, wherein the carrier lock tracks are provided by channels that are formed in the carrier and that slidingly receive the slider in the slider lock position to prevent pivoting of the slider, and thus the handle, relative to the carrier and that do not receive the slider in the slider release position to permit pivoting of the slider, and thus the handle, relative to the carrier.

5. The child transport carrier with lock-release mechanism of claim 1, wherein the handle includes a guide track that engages the slider to pivot the slider with the handle but to permit the slider to slide between the slider lock and release positions.

6. The child transport carrier with lock-release mechanism of claim 5, wherein the handle guide track is provided by a radially extending channel that is formed in the handle and that slidingly receives the slider to guide the slider between the slider lock and release positions and that pivotally retains the slider to cause the slider to pivot with the handle.

7. The child transport carrier with lock-release mechanism of claim 1, further comprising a shaft that pivotally mounts the handle to the carrier and a curved space that is defined by the carrier, positioned radially outward of and coaxial with the pivot shaft, and positioned radially inward of and in communication with the carrier lock tracks so that the slider is free to pivot through the curved space and between alignment with each of the lock tracks when the slider is in the release position.

8. The child transport carrier with lock-release mechanism of claim 7, wherein first and last lock tracks of the plurality of lock tracks define respective stop surfaces positioned at opposing ends of the curved space and contacted by the slider in the slider release position when the handle is pivoted to limit the pivoting travel range of the handle.

9. The child transport carrier with lock-release mechanism of claim 1, wherein each one of the lock tracks defines a respective discretely indexed one of the handle positions.

10. The child transport carrier with lock-release mechanism of claim 1, wherein the pivotal arm is pivotally mounted to the handle and is depressed toward the handle from the actuator lock position to the actuator release position to move the slider from the slider lock position to the slider release position.

11. The child transport carrier with lock-release mechanism of claim 10, wherein the actuating portion extends out of the handle and is exposed for depressing by a user, and the lever portion contacts the slider, and wherein the pivotal arm is positioned laterally spaced from the lock tracks, the pivotal arm and the slider are movable in the same plane, and the slider is engageable by the pivotal arm free of interference with the carrier lock tracks.

12. The child transport carrier with lock-release mechanism of claim 1, wherein the plurality of handle positions defined by the plurality of lock tracks comprises a first upright carry position for carrying the carrier, a second partially lowered access position for allowing access to an interior of the carrier, and a third lowered support position for propping the carrier on a support surface to prevent rocking.

13. A car seat for mounting in a vehicle and securing a child, the car seat comprising:
   a carrier to which the child can be secured;
   a pivotal carrying handle extending from the carrier and repositionable in a plurality of discretely indexed handle positions; and
   a handle lock-release mechanism, comprising:
   a plurality of radially extending lock tracks on the carrier, wherein each of the lock tracks defines a respective one of the handle positions,
   a radially extending guide track on the handle,
   a slider that includes a head and tail extending from the head, wherein the slider tail is engageable by and slideable radially along each of the carrier lock tracks between a lock position and a release position, in the lock position the slider tail engages one of the lock tracks to secure the handle in the respective handle position, in the release position the slider tail does not engage any of the lock tracks to permit the slider to pivot between alignment with the lock tracks as the handle is pivoted between the handle positions, wherein the slider head is engaged by the guide track to cause the slider to pivot with the handle but to permit the slider to slide radially along the guide track between the slider lock and release positions, wherein the slider is spring-biased toward the lock position, the release position of the slider is radially inwardly positioned relative to the lock position of the slider, and the slider head extends axially from the tail and is positioned laterally spaced from the lock tracks;
   an actuator moveable between a lock position and a release position, wherein the spring-biased slider engages and biases the actuator toward the lock position, and actuating the actuator from the lock position to the release position moves the slider from the lock position to the release position; and
   a shaft pivotally mounting the handle to the carrier and a spring that provides the spring-biasing of the slider toward the slider lock position, wherein the slider further comprises a body that is positioned between the head and the tail, is engageable by the actuator, is not engageable by the carrier lock tracks or the handle guide track, defines a recess that receives the spring with the spring positioned between the shaft and the slider, and is generally U-shaped with two arms extending on opposite sides of the pivot shaft to define an interposed guide slot in which the pivot shaft is received and the spring is retained.

14. The car seat of claim 13, wherein the lock tracks are provided by channels that are formed in the carrier and that slidingly receive the slider tail in the slider lock position to prevent pivoting of the slider, and thus the handle, relative to the carrier and that do not receive the slider tail in the slider release position to permit pivoting of the slider, and thus the handle, relative to the carrier.

15. The car seat of claim 13, further comprising a shaft that pivotally mounts the handle to the carrier and a curved space that is defined by the carrier, positioned radially outward of and coaxial with the pivot shaft, and positioned radially inward of and in communication with the carrier lock tracks so that the slider tail is free to pivot through the curved space and between alignment with each of the lock tracks when the slider is in the release position.

16. The car seat of claim 15, wherein first and last lock tracks of the plurality of lock tracks define respective stop surfaces positioned at opposing ends of the curved space and contacted by the slider tail in the slider release position when the handle is pivoted to limit the pivoting travel range of the handle.

17. The car seat of claim 13, wherein the actuator is pivotally mounted to the handle and is depressed toward the handle to move the actuator from the actuator lock position to the actuator release position, the actuating portion extending out of the handle and being exposed for depressing by a user, the lever portion contacting the slider, the pivotal arm being positioned laterally spaced from the lock tracks, the pivotal arm and the slider being movable in the same plane, and the slider being engageable by the pivotal arm free of interference with the lock tracks.

* * * * *